(12) United States Patent
Qiang et al.

(10) Patent No.: US 9,971,645 B2
(45) Date of Patent: May 15, 2018

(54) AUTO-RECOVERY OF MEDIA CACHE MASTER TABLE DATA

(71) Applicant: Seagate Technology LLC, Cupertino, CA (US)

(72) Inventors: Jian Qiang, Singapore (SG); WenXiang Xie, Singapore (SG); Thein Than Zaw, Singapore (SG); Brian T. Edgar, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 161 days.

(21) Appl. No.: 15/244,113

(22) Filed: Aug. 23, 2016

(65) Prior Publication Data

US 2018/0060162 A1    Mar. 1, 2018

(51) Int. Cl.
| | |
|---|---|
| *G06F 11/00* | (2006.01) |
| *G06F 11/10* | (2006.01) |
| *G06F 3/06* | (2006.01) |
| *G06F 12/128* | (2016.01) |
| *G06F 11/14* | (2006.01) |
| *G06F 11/16* | (2006.01) |
| *G06F 11/20* | (2006.01) |

(52) U.S. Cl.
CPC .......... *G06F 11/1064* (2013.01); *G06F 3/065* (2013.01); *G06F 3/0619* (2013.01); *G06F 3/0655* (2013.01); *G06F 3/0688* (2013.01); *G06F 11/1451* (2013.01); *G06F 11/1458* (2013.01); *G06F 11/1469* (2013.01); *G06F 11/1662* (2013.01); *G06F 11/2064* (2013.01); *G06F 12/128* (2013.01); *G06F 2201/84* (2013.01); *G06F 2212/69* (2013.01)

(58) Field of Classification Search
CPC ............ G06F 11/1458; G06F 11/1469; G06F 11/1662; G06F 11/2064
See application file for complete search history.

(56) References Cited

U.S. PATENT DOCUMENTS

| | | |
|---|---|---|
| 5,649,139 A | 7/1997 | Weinreb et al. |
| 6,507,853 B2 | 1/2003 | Bamford et al. |
| 6,516,426 B1 | 2/2003 | Forehand et al. |
| 7,636,807 B2 | 12/2009 | Shin et al. |
| 7,707,184 B1 | 4/2010 | Zhang et al. |
| 7,711,923 B2 | 5/2010 | Rogers et al. |
| 7,966,456 B2 | 6/2011 | Trika et al. |

(Continued)

*Primary Examiner* — Charles Ehne
(74) *Attorney, Agent, or Firm* — Hall Estill Attorneys at Law (57) ABSTRACT

Apparatus and method for managing a media cache of a data storage device. In some embodiments, a media cache master table is maintained in a memory as a data structure having a plurality of entries that describe data sets stored in a non-volatile media cache memory. A first timecode stamp value is written to respective first and second locations in the table at the commencement of a data transfer operation to transfer data associated with the plurality of entries in the table. The first location is updated with a new, second timecode stamp value responsive to detection of an error condition that interrupts the data transfer operation. An error recovery operation is subsequently performed responsive to a detected mismatch between the timecode stamp values in the first and second locations.

20 Claims, 5 Drawing Sheets

(56) References Cited

U.S. PATENT DOCUMENTS

| | | | |
|---|---|---|---|
| 8,255,731 B1* | 8/2012 | Alsina | G06F 11/1458 |
| | | | 713/300 |
| 8,560,770 B2 | 10/2013 | Haines et al. | |
| 8,655,850 B2 | 2/2014 | Ngo et al. | |
| 9,208,210 B2 | 12/2015 | Erofeev | |
| 9,280,477 B2 | 3/2016 | Friendshuh et al. | |
| 9,547,598 B1* | 1/2017 | Karnowski | G06F 12/0833 |
| 2004/0236983 A1* | 11/2004 | Burton | G06F 11/2058 |
| | | | 714/6.23 |
| 2008/0005509 A1 | 1/2008 | Smith et al. | |
| 2011/0161557 A1 | 6/2011 | Haines et al. | |
| 2012/0310894 A1* | 12/2012 | Freedman | G06F 11/1402 |
| | | | 707/674 |
| 2016/0098352 A1 | 4/2016 | Tan et al. | |
| 2017/0147628 A1* | 5/2017 | Park | G06F 17/30371 |

* cited by examiner

AUTO-RECOVERY OF MEDIA CACHE MASTER TABLE DATA

SUMMARY

Various embodiments of the present disclosure are generally directed to an apparatus and method for managing a media cache in a data storage device.

In some embodiments, a media cache master table is maintained in a memory as a data structure having a plurality of entries that describe data sets stored in a non-volatile media cache memory. A first timecode stamp value is written to respective first and second locations in the table at the commencement of a data transfer operation to transfer data associated with the plurality of entries in the table. The first location is updated with a new, second timecode stamp value responsive to detection of an error condition that interrupts the data transfer operation. An error recovery operation is subsequently performed responsive to a detected mismatch between the first and second locations.

In other embodiments, a data storage device has a non-volatile main memory configured to provide long term storage of user data supplied to the data storage device from a host device. A non-volatile media cache memory is configured to temporarily store user data received from the host device prior to a transfer of the user data from the media cache memory to the main memory. A first non-volatile memory is configured to store a first media cache master table as a data structure having a plurality of entries that describe the user data in the media cache memory. A different, second non-volatile memory is configured to store a redundant, second media cache master table nominally as a backup copy of the first media cache master table. A master cache controller circuit is configured to write a first timecode stamp value to each of a first location and to a different, second location in the first media cache master table at a commencement of a data transfer operation to copy at least one of the plurality of entries from the first media cache management table to the second media cache management table, to update the first location with a subsequent, second timecode stamp value without updating the previously written first timecode stamp value in the second location responsive to detection of an error condition that interrupts the data transfer operation, and to subsequently perform an error recovery operation associated with the plurality of entries responsive to a detected mismatch between the newer, second timecode stamp value in the first location and the older, first timecode stamp value in the second location.

These and other features and advantages which may characterize various embodiments can be understood in view of the following detailed discussion and the accompanying drawings.

DETAILED DESCRIPTION

Various embodiments of the present disclosure are generally directed to the management of data in a data storage device that employs a media cache (MC).

Data storage devices are electronic-based user devices that include digital memory configured to store and retrieve data associated with a user. Storage devices can take a variety of forms, such as hard disc drives (HDDs), solid-state drives (SSDs), hybrid drives, thumb drives, etc. Such devices are often coupled to a host device to receive and store data for the host.

Some data storage devices are equipped with a non-volatile media cache (MC). The media cache operates to temporarily store write data received from a host until it can be subsequently transferred to a non-volatile main memory (main store) for longer term storage of the data. As will be recognized, non-volatile memory is memory of a type such that the memory continues to retain written data even when applied power is removed from the device.

An upstream volatile write buffer (e.g. DRAM, etc.) can be used to initially receive the write data, after which the data are transferred either to the media cache or the main memory. An advantage of the use of a media cache is that the input data can be quickly written to a non-volatile memory without the delays associated with placing the data in the final destination memory. This can enhance overall observed data I/O transfer rate performance of the data storage device while ensuring that the data have been securely written to a non-volatile memory.

Because data written to a media cache are usually intended to only reside in the media cache for a short time prior to migration to the long term main memory storage, storage devices that employ media cache elements usually implement some sort of media cache management system that tracks the data written to the media cache and schedules the subsequent transfer of the data to the main memory. Some systems utilize a media cache master table that tracks various parameters such as identification (ID) values for the data in the media cache such as by a logical address (e.g., a logical block address, LBA), revision level for the data, location of the data within the media cache, and so on.

Because of the critical nature of such tracking tables, some data storage devices employ mechanisms to ensure the data integrity of the tables at all times. One such mechanism involves the generation and maintenance, in real time or near real time, multiple redundant copies of the media cache management table in different locations in different memories within the device. In this way, should a data corruption event such as an unsafe power down operation occur, the system can at least theoretically recover the true state of the media cache during a subsequent system reinitialization without a loss of user data.

While operable, one limitation with such approaches has been found if multiple data corrupting events occur in succession during a table recovery operation. In one real world example, it has been found that if an unsafe power down condition causes a corruption of a particular copy of the media cache master table, upon a subsequent power up operation the contents of the "good" table can be copied over to the "corrupted" table to bring both tables up to the latest version. In some cases, if a subsequent unsafe power down condition is experienced before this data transfer operation is completed, both tables may be left in a condition where the actual state of the media cache is indeterminate; that is, it may be unclear which table represents the true state of the media cache. It follows that "bad" data entries may be copied over onto "good" data entries if the signifiers indicating the table state are inaccurate.

Accordingly, various embodiments of the present disclosure are directed to an apparatus and method for managing a media cache in a data storage device. As explained below, some embodiments generally involve arranging a data storage device to have a media cache (MC) and a main memory (MM). The forms of these respective memory locations can vary depending on the requirements of a given application. In some embodiments, the media cache may be formed of a portion of one or more rotatable magnetic recording media, such as an outer band of tracks that provides a relatively high rate of I/O data transfer rate performance. In other embodiments, the media cache may be formed of a distinct form of memory such as solid state semiconductor non-volatile memory (e.g., flash, STRAM, RRAM, etc.).

At least first and second media cache master tables (MCMT) are maintained in separate memory locations to describe data written to the media cache. One of the MCMT data structures may be designated as a primary, or first MCMT (e.g., MCMT 1) and another of the MCMT data structures may be designated as a redundant, or second MCMT (e.g., MCMT 2). The respective MCMT 1 and MCMT 2 data structures are updated in real time or near real time responsive to data transfers into and out of the media cache.

In accordance with some embodiments, a timecode stamp is appended to a header portion and a footer portion of each of the MCMT data structures each time that a data update operation is performed upon the associated data structure. The timecode stamp can take any number of suitable forms to provide an absolute time value for the occurrence of the update. Examples can include a running count value measuring seconds or portions thereof from a given index time reference, day/week/month/year plus an hours/minutes/seconds/milliseconds measure for absolute time, etc.

When a given table structure is updated, the then-existing timecode stamp information is written to multiple fields within the data structure, such as the aforementioned header and footer locations. In this way, when examining a given table, if the timecode stamps in both the header and footer match, it can be assured that the data entries within the table that describe the contents of the MC are up-to-date and accurate. Moreover, when examining the matching timecode stamps of multiple tables, the table having the most recent timecode stamps can be relied upon as being up-to-date and being the most recent successfully updated table.

When a data update operation is performed to transfer data entries from one table to the next, the donor table (e.g., the table from which the data are being transferred) is updated with the then-existing value in both the header and footer locations thereof. The receiving table (e.g., the table to which at least some of the updated entries are being transferred) receives the same timecode stamp in only one location, such as the header location. Only when the transfer is completed the second location in the receiving location, such as the footer location, is updated. In this way, should a table be found to have non-matching timecode stamps, it can be understood that some sort of anomalous exception condition arose during a data transfer.

In further embodiments, if during a data transfer from one table to the next, should a transfer update operation be interrupted due to an exception condition such as an unsafe power down operation, a new, most recent timecode stamp can be written to at least one of the tables such as the donor table. In this way, the unmatching timecode stamps can signify that the transfer operation was interrupted since the timecode stamp in the header will be later than the timecode stamp in the footer (or vice versa). Moreover, since the donor table will have the most recent timecode stamp, it can be understood that the donor table is the most recent version, allowing a comparison between the respective tables and updates as necessary to bring the receiving table into conformance with the donor table. Once updated, all new timecodes can be written to both tables.

In further embodiments, other mechanisms can be utilized by the respective tables to track changes, such as an incrementing sequence number that is also employed by both tables. The sequence number can also be incremented each time each table is implemented. Matching sequence numbers can further signify that the tables match; however, the addition of the datacode stamps ensures that tables otherwise having the same sequence numbers are in synchronization or not based on whether the timecode stamps also match.

Figure 1:
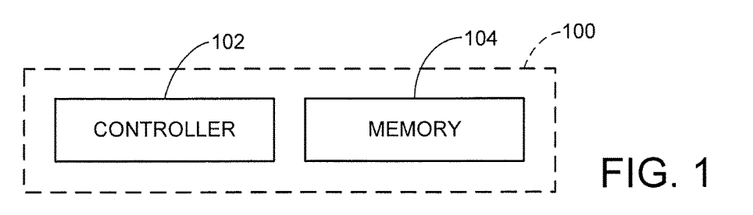
FIG. 1 provides a functional block representation of a data storage device in accordance with various embodiments of the present disclosure.

These and other features and advantages of various embodiments can be understood beginning with a review of FIG. 1 which shows a simplified functional block representation of a data storage device 100. The data storage device 100 includes a controller 102 and a memory module 104.

The controller 102 is a hardware or processor based circuit that provides top-level control of the device 100. In some embodiments, the controller 102 may be one or more programmable processors that utilize programming instructions stored in a local memory which are executed by the processor as required.

The memory module 104 can take a variety of forms, and includes one or more forms of non-volatile data storage memory to store user data supplied by the host device. The non-volatile data storage memory can take a variety of forms including but not limited to rotatable magnetic recording media (discs), solid state semiconductor memory (e.g., flash memory cells, STRAM, RRAM, etc.), etc. The memory module 104 can include additional elements including read/write/erase control circuitry, data buffers, memory controller circuitry, etc. configured to manage the writing and subsequent reading of data to and from the non-volatile memory. In some cases, the controller functionality can be incorporated directly into the memory module.

Figure 2:
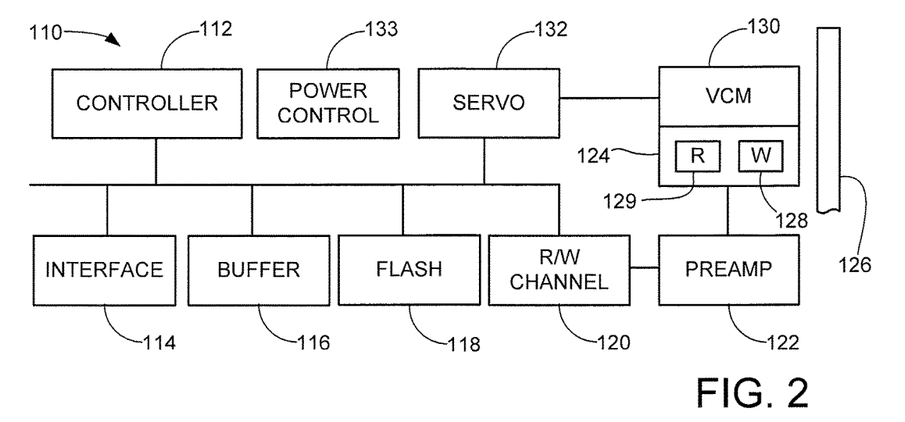
FIG. 2 is a functional block representation of the data storage device of FIG. 1 in accordance with some embodiments.

FIG. 2 shows a functional block representation of a data storage device 110 corresponding to the device 100 of FIG. 1. The data storage device 110 is characterized as a hard disc drive (HDD) in accordance with some embodiments. Other forms of storage devices can be used as desired.

A top level controller 112 similar to the controller 102 in FIG. 1 provides communication and control functions. An interface circuit 114 interfaces with the host device via a selected interface protocol (e.g., SATA, SAS, Fibre Channel, Ethernet, USB, etc.). A local data buffer 116 provides temporary storage of user data being transferred to and from the host. The buffer 116 may be a volatile local memory, such as a DRAM, and may store control data and programming used by the controller 112 as well. A local non-volatile memory (flash) 118 can also provide local storage of data as required. The flash memory 118 may take a NAND and/or a NOR configuration.

A read/write (R/W) channel circuit 120 conditions data during write and read operations using a preamplifier/driver (preamp) circuit 122 and a data transducer 124. The transducer 124 is supported adjacent a rotatable magnetic recording medium (disc) 126 and includes a write (W) element 128, such as a perpendicular magnetic write coil, and a read (R) sensor 129, such as a magneto-resistive (MR) responsive element.

The respective elements 128, 129 are positioned adjacent concentric tracks defined on the data recording surface of medium 126 using a voice coil motor (VCM) 130 and a closed loop servo control circuit 132. While not shown in FIG. 2, the servo control circuit 132 also operates a spindle motor used to rotate the stack of magnetic media discs 126.

A power control circuit 133 receives and conditions power values, such as supply voltage and/or current, for use by the various active elements of the storage device 110. The power may be supplied by a local device such as a battery or externally from the host or another power source.

Figure 3:
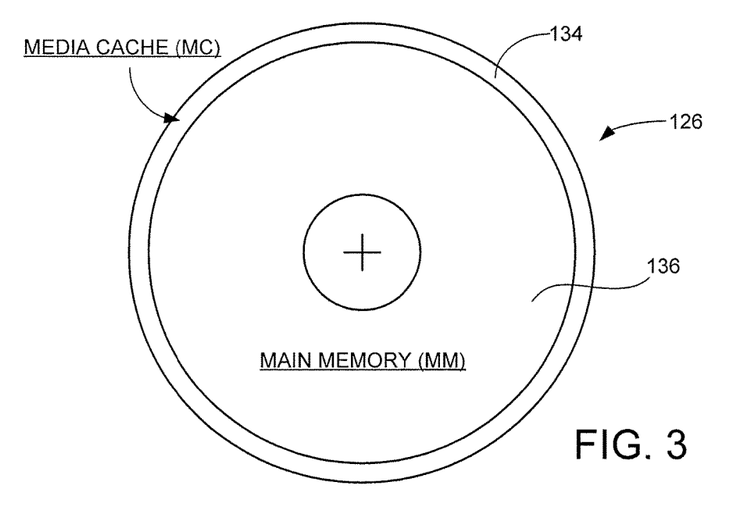
FIG. 3 shows a media cache and main memory of a rotatable data recording surface of the device of FIG. 2 in accordance with some embodiments.

FIG. 3 shows a data recording surface of the medium 126 in accordance with some embodiments. The surface is arranged into two main zones: a media cache (MC) 134 and a main memory (MM) 136. Each of these respective zones 134, 136 comprise a number of adjacent concentric data tracks configured to store user data supplied by the host device. The media cache 134 may be arranged adjacent the outermost diameter of the recording surface as depicted in FIG. 3, or may be located elsewhere on the disc surface. In alternative embodiments, the media cache (or portions thereof) may be provisioned elsewhere within the storage device, including in the flash memory 118 (FIG. 2). The tracks can take any number of suitable forms, including shingled magnetic recording (SMR) tracks, two dimensional magnetic recording (TDMR) tracks, bit patterned media tracks, etc.

As will be recognized, the media cache 134 operates as a temporary storage location for input write data. During a write operation, input data are temporarily received and stored in the volatile buffer memory 116 (see FIG. 2). A write channel portion of the channel circuit 120 conditions the data by applying various encoding operations such as run length limited (RLL) encoding, encryption, data compression, error correction encoding (ECC), etc., and directions the writing of the encoded input data to the media cache 134. A write complete status may be returned to the host device prior to or after the writing of the data to the MC 134.

Thereafter, at an appropriate time a background data transfer operation is scheduled and performed to subsequently transfer the data from the media cache 134 to the main memory 136. A copy of the data may be retained within the media cache 134 for a time to facilitate the possibility of cache hits upon the data. Cache management schemes, such as least recently used (LRU) eviction methods, can be used to maintain the data levels within the media cache 134 at appropriate levels.

The size of the media cache 134 relative to the overall data storage capabilities of the main memory 136 can vary depending on the requirements of a given application. In some cases, each of the data recording surfaces has its own portion of the media cache 134 arranged adjacent the OD of the associated surface as shown in FIG. 3, so that all of the portions comprise the overall available media cache. As noted above, other locations can additionally and/or alternatively used as the media cache as well, including at least a portion of the flash memory 118 in FIG. 2.

Figure 4:
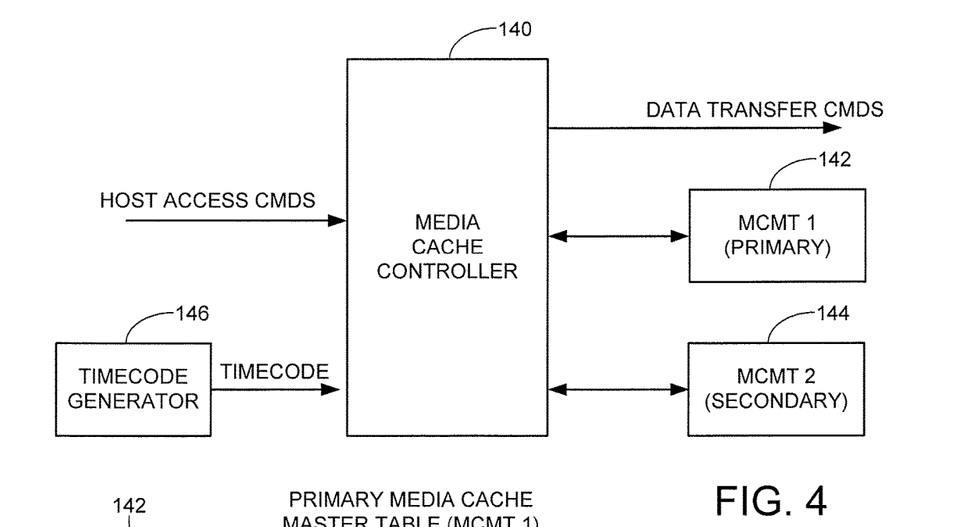
FIG. 4 illustrates a media cache controller of the device in accordance with some embodiments.

FIG. 4 shows a media cache controller circuit 140 constructed and operated in accordance with some embodiments. The MC controller 140 may form a portion of the top level controller functionality, or may be realized as a separate hardware or programmable processor of the storage device 110. For example, if a programmable servo processor is used as part of the servo control circuit 132, the MC controller 140 may form a portion of the programming of this processor. The MC controller 140 generally operates to manage data transfers into and out of the MC 134.

To this end, the MC controller 140 processes input host access commands, such as data read and write commands received from the host device, and outputs corresponding data transfer commands, such as commands to write data to the media cache 134, transfer data from the media cache 134 to the main memory 136, and so on.

Because the MC controller 140 is required to maintain an up-to-date and accurate status of the data stored in the media cache 134, the MC controller maintains a number of data structures referred to herein as media cache master tables (MCMTs). Two such data structures are represented in FIG. 4, the first or primary table 142 denoted as MCMT 1, and the secondary or redundant table 144 denoted as MCMT 2. The purpose of two (or more) tables is to ensure redundancy and reliability since generally, a loss of accuracy in the description of the state of the system due to corruption of the tables would at least potentially, if not actually, lead to the storage device being unable to accurately return the data supplied to the storage device by the host for storage.

The respective tables are data structures that are maintained in separate non-volatile memory locations, such as the flash memory 118, a portion of the media cache 134, a portion of the main memory 136, etc. In applications involving multiple discs/heads, the various redundant tables may be written to different disc surfaces. The use of different non-volatile memory locations for the respective copies of the tables enhances reliability since at least one copy will presumably be recoverable even if an error condition arises associated with one of the memory locations.

During operation, a copy of one (or more) of the tables may be loaded to a local memory, such as the volatile buffer memory 116 for ready access by the MC controller 140, provided the updated table is written to the designated non-volatile memory location prior to deactivation of the storage device 110.

A timecode generator circuit 146 is coupled to the MC controller 140. The timecode generator circuit 146 supplies timecode values for use by the MC controller 140 in a manner that will be discussed below.

Figure 5:
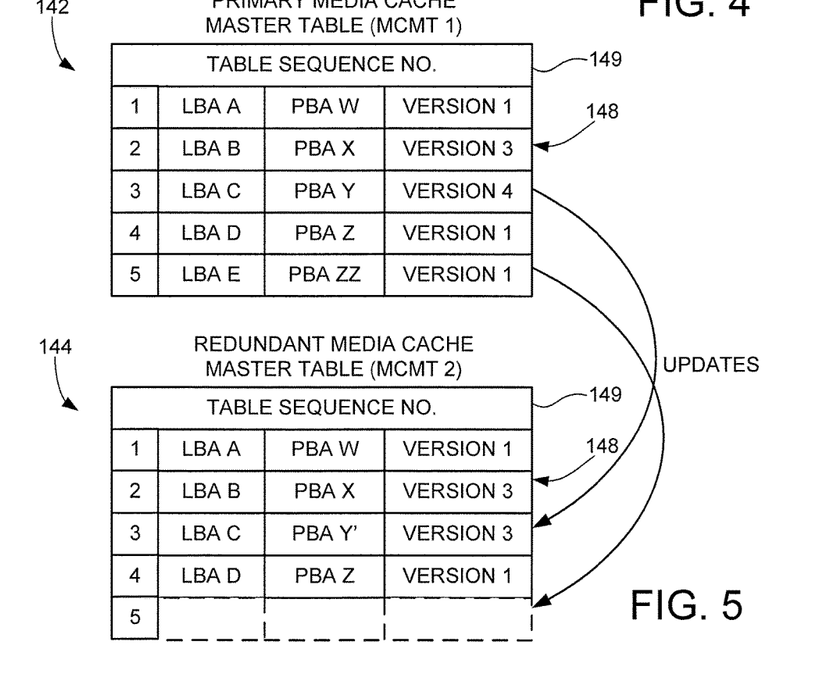
FIG. 5 provides exemplary formats for primary and redundant media cache master tables used by the media cache controller of FIG. 4.

FIG. 5 illustrates at least portions of the respective MCMT 1 and 2 tables 142, 144 in accordance with some embodiments. In some cases, the primary table 142 (MCMT 1) is updated in real time and updates to the redundant table 144 (MCMT 2) are carried out on a frequent, near real-time basis. Each table may be arranged as shown in FIG. 5 as a number of entries (rows) 148, with each entry associated with a block or set of data that has been placed in the media cache 134. Other formats and types of data may be used as part of the MCMT format as desired, so the arrangement in FIG. 5 is merely exemplary and is not limiting. For example, in other embodiments each entry 148 may store one or more status values indicating whether a copy of the data has been transferred to the main memory 136, whether the data are current or stale, etc.

The first entry in MCMT 1 shows a particular data block identified as LBA A (logical block address A) is stored at a given PBA W (physical block address) and is currently identified as a first version (Version 1). The LBA value is one form of a logical address used at the host level to identify the block. A range of LBA values can be used in the table as desired to denote a range of LBAs. Each LBA may correspond to a fixed amount of user data, such as a sector of data of 512 bytes or some other amount. Other forms of host level logical addressing may be used including virtual block addresses (VBAs), key-block data values, etc.

The PBA value may identify a particular physical data sector within the MC 134, such as by track, offset from a once around index point, etc. If solid state semiconductor data are used as the MC, the PBA may instead identify a particular garbage collection unit (GCU), erasure block, page, bit offset, etc. Such addressing is well known in the art and can be utilized as required to fit the requirements of a given application.

A comparison of the respective tables 142, 144 in FIG. 5 shows that there are two entries in the primary table MCMT 1 that have not yet been updated to the redundant table MCMT 2. More particularly, the third entry in MCMT 1 indicates that a newer updated version of LBA C has been written to the media cache 134 since the last time that the redundant table MCMT 2 has been updated. The fifth entry in MCMT 1 indicates that a new LBA E has been written to the media cache 134 since the last time that the redundant table MCMT 2. Even if both tables are continuously updated, it is contemplated that for at least certain instances in time, one of the tables may lag the other. While the system of FIG. 4 is configured to usually update the primary table MCMT 1 first, such is not necessarily required in that there may be times when the redundant table MCMT 2 is more up to date and is used to update the primary table MCMT 1.

To this end, table sequence numbers may additionally be provided for each table, as further shown in FIG. 5. The sequence numbers may be arranged in a table sequence no. field 149 located in a header section of each table, or in another suitable location. Generally, the sequence numbers can be an incrementing count over some suitably large range such that, each time a given table is updated, either directly or as a result to bring that table up to date with respect to the other table, the associated sequence number will be incremented. A counter circuit or other mechanism can be used to provide the incremented sequence number values.

The sequence number values generally allow the MC controller 140 to quickly determine which table has been most recently updated. Referring again to the simplified example from FIG. 5, the sequence number for the primary table MCMT 1 may be higher than the sequence number for the secondary table MCMT 2, allowing the MC controller 140 to quickly perform a comparison operation and make the aforementioned updates to MCMT 2. The MC controller 140 may further operate to update the sequence number for MCMT 2 during the update operation so that it matches the sequence number in MCMT 1.

Figure 6:
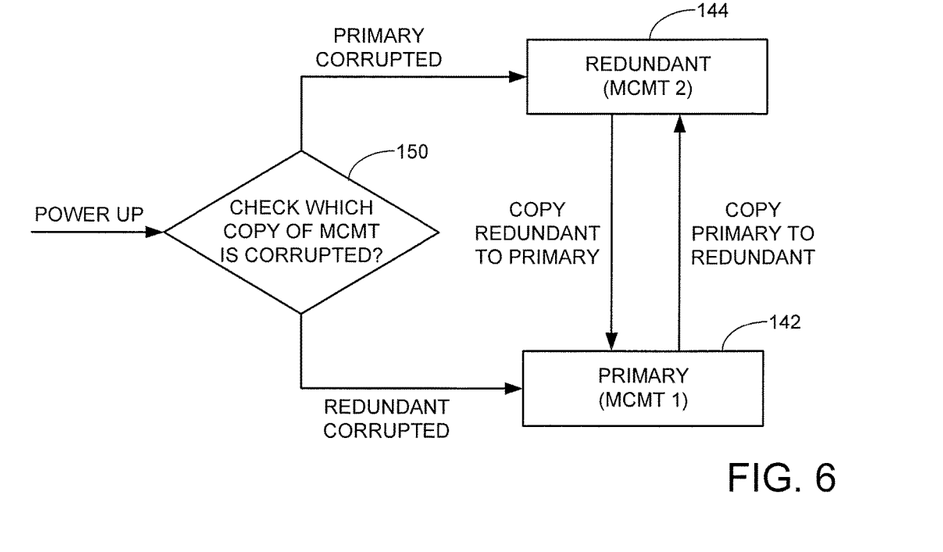
FIG. 6 is a process flow utilized by the media cache controller during a power up operation for the device.

FIG. 6 provides a logic sequence flow that can be utilized during an initialization (e.g., power up) operation for the device. Upon a power up operation, decision block 150 determines whether one or more of the MCMT tables 142, 144 is corrupted (e.g., not representing the latest and correct state for the system). Additional checks are used to assess the respective states of the two tables which will be discussed below. At this point, however, the state of the tables can include a simple check to determine whether the sequence numbers match. If so, the system can proceed with initialization. If not, the table having the higher sequence number can be determined as the latest state of the system. As noted previously, if the primary table MCMT 1 is corrupted, a transfer can occur from the secondary table MCMT 2, and if the secondary table MCMT 2 is corrupted, a transfer can occur from the primary table MCMT 1.

Figure 7:
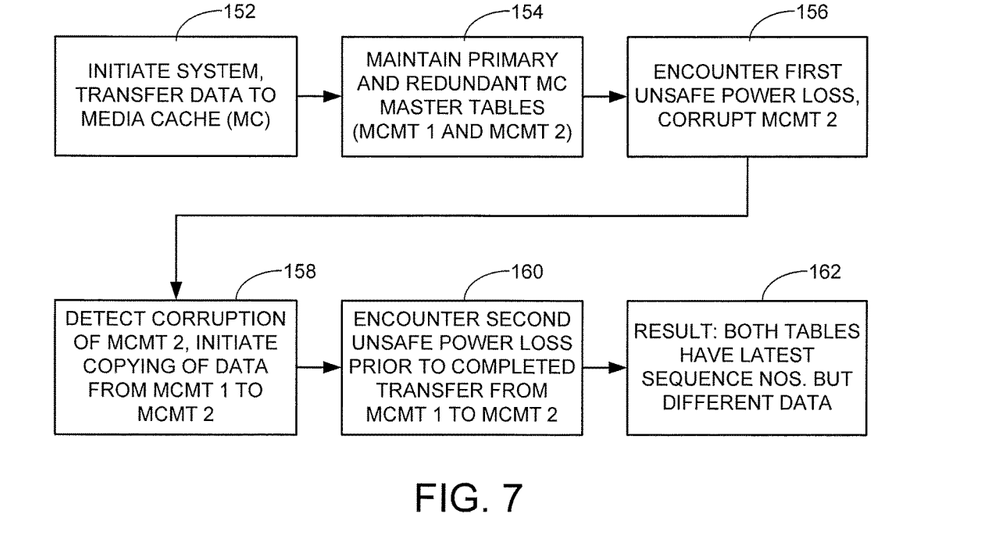
FIG. 7 illustrates a process flow in which data corruption may occur during the power up operation depicted in FIG. 6.

While operable, the foregoing approach can be subject to situations where the state of the tables may become indeterminate, which may affect the ability of the storage device 110 to properly determine the existing state of the MC 134. FIG. 7 shows a flow diagram of operations that may arise to cause this condition. Other operations may arise as well that induce overt or latent errors in both (or all) of the MCMT tables.

As shown in FIG. 7, the storage system 110 is initiated at block 152 and readied for normal operation. This includes the transfer of input write data received from the host to the MC 134. During such operations, the primary and redundant MCMT 1 and MCMT 2 tables 142, 144 are updated to reflect the current state of the MC 134, as indicated by block 154.

A first unsafe power loss is experienced at block 156 that results in the corruption of MCMT 2. This may be an unscheduled power down operation that took place in such a way that there was insufficient time to ensure that the data as reflected in the primary table MCMT 1 were fully transferred to the secondary table MCMT 2.

Upon a subsequent reinitialization of the system, block 158, the corruption of MCMT 2 is detected and, as discussed above in FIG. 6, a transfer of data is initiated to copy over various data entries from MCMT 1 to MCMT 2 (see FIG. 5). As noted above, one way in which the corrupted state of MCMT 2 may be detected is based on the sequence numbers not matching in the respective tables.

As shown by block 160, it is contemplated that, prior to completion of the copying of the data from MCMT 1 to MCMT 2, a second unsafe power loss condition is encountered so that less than all of the entries from MCMT 1 were copied to MCMT 2. This may arise as a result of a number of conditions including multiple faulty source power errors, etc. Should the sequence number for MCMT 2 now reflect the latest sequence number, at a subsequent power up the two tables will appear to be in synchronization, but the data within the two tables will not match. As noted above, this is one of several real world scenarios that may arise such that the data in the respective tables are not the same, although certain control data or flags, such as the sequence numbers, do not indicate the presence of the error.

Figures 8, 9:
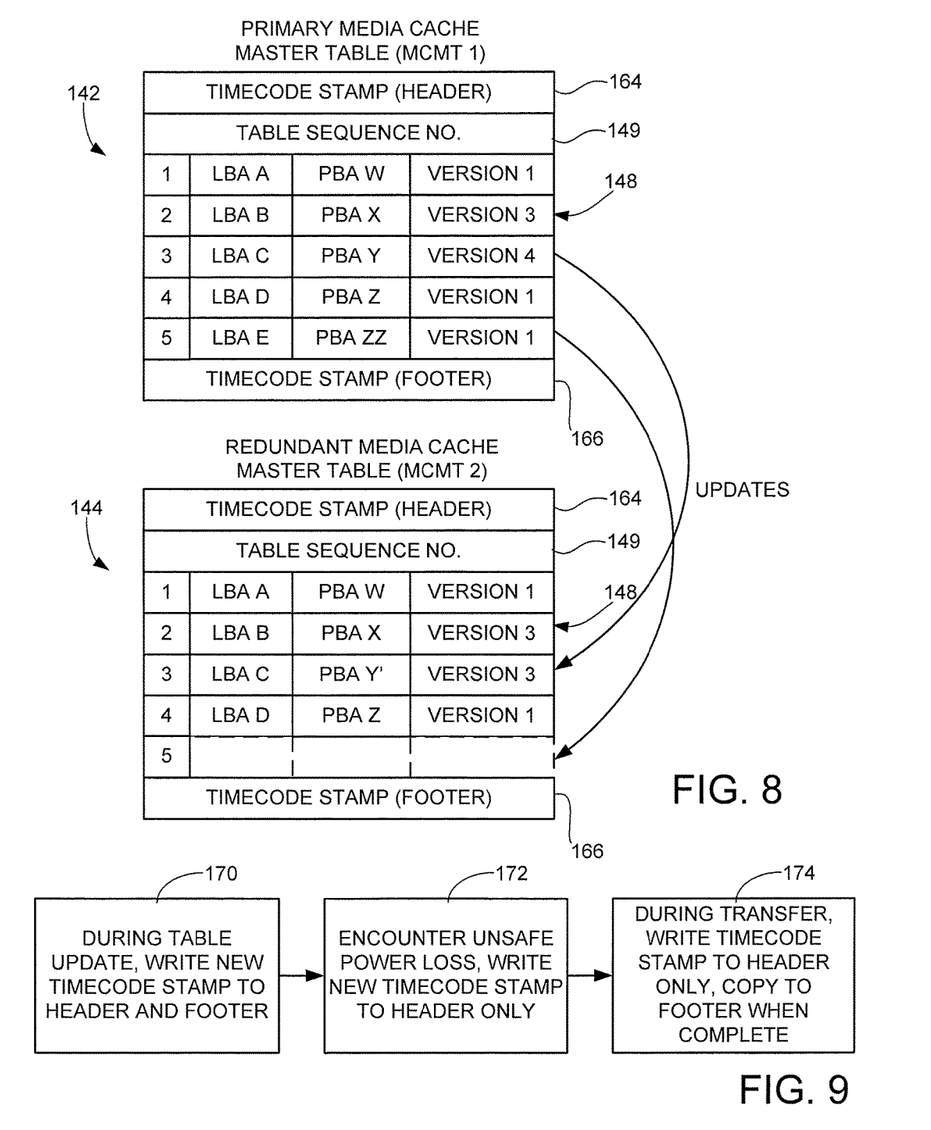
FIG. 8 illustrates another format for the respective primary and redundant media cache master tables in accordance with some embodiments to address the data corruption of FIG. 7.
FIG. 9 is another process flow using the illustrative format of FIG. 8.

To address this and provide further redundancy and reliability, various embodiments configure the respective tables MCMT 1 and MCMT 2 with additional control values as depicted in FIG. 8. More particularly, the primary MCMT 1 table 142 and the redundant MCMT 2 table 144 are shown to include a header timecode stamp field 164 and a footer timecode stamp field 166 located in respective header and footer portions of each table. While headers and footers provide convenient locations for such information, other locations within the data structures can be used as desired.

The timecode stamp values are supplied by the timecode generator circuit 146 (see FIG. 4) and can take any number of suitable forms to provide unique identifiers at different points in time. In some embodiments, the timecode stamp values represent a continuously incrementing count value at some appropriate resolution (including seconds or portions thereof). A counter or other circuit can be used to generate such values, initialized at a first multi-bit value (e.g., 000000000 . . . ) and sequentially increments to a maximum second multi-bit value (e.g., 11111111 . . . ) before returning to the first value. The rate of increment and size of the timecode stamp value should be sufficient to ensure that the wrap rate is long enough to cover an extended period of time of device operation (e.g., days, weeks, months, etc.) before returning to the initial value. A similar mechanism can be used for the sequence number values in field 149.

In other embodiments, the timecode stamp value may be a date and time reference based on absolute or system time, with a format that may include day/week/month/year data plus an hours/minutes/seconds/milliseconds measure, etc. Any number of suitable formats and sources for the timecode stamp can be used, provided such are sufficiently tamperproof to reduce the likelihood of an attacking party from attacking the system by injecting erroneous timecode values into the system.

For hardened security systems, encryption, HMACs or other data security scheme mechanisms may be used to ensure the validity of the respective timecode values. The MC controller 140 can be configured with such capabilities as required so that the input timecode stamp values are subjected to a suitable cryptographic function prior to being written to the respective timecode stamp fields. The MC controller 140 can subsequently apply on-the-fly decryption or other data decoding techniques to evaluate the recovered encrypted timecode values.

Generally, the timecode stamp values are used each time that a given one of the tables 142, 144 is updated. In some embodiments, each time a given one of the tables is updated, a then-existing datecode stamp value is procured, processed as required, and written to both the header and footer sections of the associated table (e.g., fields 164, 166).

To provide a concrete illustration, as each new entry is added in real time to the primary MCMT 1 table 142 in FIG. 8, the update operation will include writing the same datecode value to both the header and footer fields 164, 166 as shown. As before, the table sequence number for the primary MCMT 1 table 142 may also be incremented, as discussed above. As desired, the sequence numbers can also be subjected to cryptographic processing by the MC controller 140. The sequence numbers can be internally generated by the MC controller or a separate circuit such as or like the timecode generator 146.

At such time that a data transfer operation is carried out to transfer the data entries from the primary MCMT 1 table 142 to the redundant MCMT 2 table 144, the timecode stamp values in the header and footer of the primary MCMT 1 table are updated to reflect this transfer. It is contemplated although not necessarily required that this same timecode stamp value will also be written to at least one or both of the header and footer fields 164, 166 of the redundant MCMT 2 table 144.

Should the transfer be completed successfully, the table sequence number in the redundant MCMT 2 table 144 will also be updated to the latest table sequence number also reflected in the primary MCMT 1 table 142. At this instant in time, both tables will store the exact same data, including all of the entries 148 and all of the control fields (including timecode stamp fields 164, 166 and table sequence fields 149). The system can proceed with further updates to the primary MCMT 1 table 142 and follow-on transfers to the redundant MCMT 2 table 144 as new data sets are moved into (and out of) the media cache 134 using the foregoing sequence.

A special consideration arises when an unsafe power down event occurs, as generally set forth by FIG. 9. As shown by block 170, each update to a selected one of the tables (in this case, the primary table) includes the writing of a new timecode stamp to both the header and footer fields 164, 166 as discussed above. As shown by block 166, should an unsafe power loss be encountered during an update operation, the system further operates to write a new, then-current timecode stamp value to a selected one of the fields in the MCMT 1 table 142, such as the header timecode stamp field 164. The remaining one of the fields in the MCMT 1 table, such as the footer timecode stamp field 166, retains the older timecode value.

This mismatch in the respective timecode values 164, 166 in the MCMT table signify to the MC controller circuit 140 that an unsafe power condition occurred during the data transfer so that less than all of the updated entries in MCMT 1 were transferred to MCMT 2. This situation can be resolved during the next power up sequence, as explained below.

A number of variations are contemplated. It may be desirable to proceed, during the transfer, to write only a selected one of the timecode stamp fields in the receiving table with the new timecode stamp value. For example, using the present example, at the commencement of the transfer and update of data from MCMT 1 to MCMT 2, the then-existing timecode stamp value can be written to the fields 164, 166 in MCMT 1 and to only the header field 164 in MCMT 2. The footer field 166 in MCMT 2 will thus have an older timecode stamp.

If the transfer is successfully completed, the footer field 166 in MCMT 2 can also be given the most current timecode stamp, as indicated at block 174. In this way, if all four timecode stamps match among the respective fields 164, 166 in both tables (and both sequence numbers from fields 149 also match), the system can conclude that both tables were updated correctly and fully prior to the ending of the power down sequence.

On the other hand, if the system determines during a given power up sequence that one of the tables (such as MCMT 1) has a most recent datecode stamp value in field 164, an older datecode stamp value in field 166 that also matches the datecode stamp value in field 164 of MCMT 2, and field 166 in MCMT 2 is older still, an interrupted transfer occurred and the transfer should resume before clearing the system for normal operation. It will be noted that, so long as new datecode stamps are updated in this manner, the system can survive and correctly track and maintain a correct and accurate status of the state of the MC 134, no matter how many unsafe power events occur in a row.

Other arrangements and usages of the respective timecode stamp and sequence number values can be readily identified by the skilled artisan in view of the present disclosure. In one alternative case, different timecode stamps can be applied sequentially to each field 164, 166 followed by the updating of the table sequence numbers once a transfer update operation has been completed. The MC controller circuit 140 can determine from the relative values of these respective fields the state of the system, whether the tables are in synchronization, and if a mismatch has taken place, which table holds the correct state data for the system.

Figure 10:
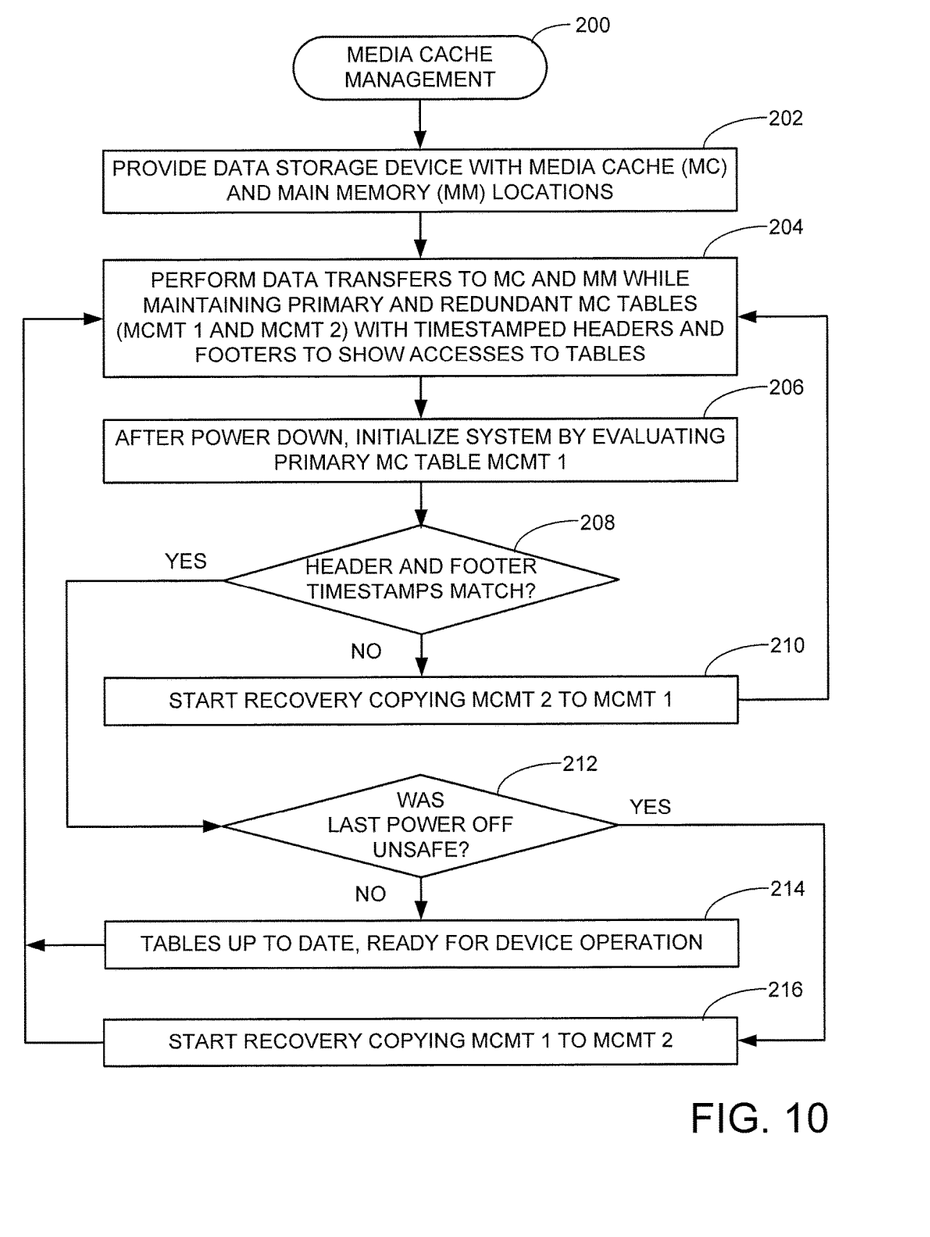
FIG. 10 is a flow chart for a media cache management routine illustrative of steps carried out in accordance with some embodiments.

FIG. 10 is a flow chart for a media cache management routine 200 illustrative of various steps carried out by the MC controller 140 in accordance with the foregoing discussion. It is contemplated that the various steps shown in FIG. 10 represent programming used by the MC controller during operation. The various steps are merely exemplary and may be modified, appended, performed in a different order, etc.

Step 202 shows an initial provision of a data storage device with a media cache and a main memory. For purposes of the present discussion, it will be presumed that the exemplary device is the HDD 110 from FIG. 2 which uses a media cache 134 and main memory 136 as generally depicted in FIG. 3.

Data transfers into and out of the media cache are initiated at step 204 responsive to various host access commands. The state of the media cache is maintained using a plurality of media cache master tables stored in different memory locations. In the present discussion, the MCMT 1 and MCMT 2 data structures 142, 144 as configured in FIG. 8 will be contemplated. Timecode stamp values and sequence values are updated as required in each table.

At step 206, a power down situation is experienced during which the device is deinitialized, followed by a power up operation to reinitialize the device. It is contemplated that the storage device has limited power generating capabilities, such as through back electromotive force (BEMF) from the spindle motor as it decelerates to a stop, to provide sufficient electrical power to enable the device to store various state data values in non-volatile memory as the system is powered down. This will include the storage of the respective MCMT table(s) if such are being updated in local volatile memory. Such power down power detection and management may be provided by the power control circuitry 133 (see FIG. 2).

As further shown by step 206, upon reinitialization the MC controller 140 examines one or both of the MCMT tables; in the present embodiment, the MC controller at least examines MCMT 1 to determine whether the header and footer timecode stamps match, decision step 208. If not, a recovery operation is performed to copy the contents between the tables, such as from MCMT 2 to MCMT 1, as indicated at step 210.

Should the header and footer timestamp values match, the flow continues to decision step 212 where the MC controller 140 determines whether the last power off operation was an unsafe power off event. Such an event might be defined as an unplanned or unexpected loss of system power from the host or other power source that supplies electrical power to the storage device 110. A safe power off event, on the other hand, might be a deinitializing operation that was commanded to the device 110 by the host while power continued to be available to the device.

It is contemplated that in the context of a safe power off, there will be sufficient time for the MC controller 140 to ensure both of the MCMT structures are complete and up to date before being stored to their respective non-volatile memory locations. On the other hand, an unsafe power off may bring into question whether both tables have been updated. A status or flag value may be set in an appropriate register or other memory location using inputs from the power control circuit 133 to signal to the device 110, upon the resumption of operation, whether the power down event was safe or unsafe.

If the most recent power down was safe, the flow continues from step 212 to step 214 where both tables are confirmed as being up to date and the MC controller 140 signifies that the device is ready for continued operation. If the most recent power down was unsafe, the flow passes from step 212 to step 216 where a transfer update operation is carried out, such as from MCMT 1 to MCMT 2. As shown from steps 210, 214 and 216, once both tables are updated or otherwise confirmed to be current, the routine passes back to step 204 and new data transfers involving the media cache 134 are carried out.

It will be understood that the various embodiments presented herein can provide a number of benefits. The use of both sequence numbers and multiple timecode stamp values in each of a number of redundant MCMT data structures can facilitate a reliable and efficient management strategy for the state data values associated with a media cache. While various embodiments have been directed to a data storage device such as an HDD that uses rotatable magnetic recording media as the main memory store, this is merely exemplary and is not required as the various techniques disclosed herein can be readily adapted to any number of different forms of data storage.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A method comprising:
  maintaining a media cache master table as a data structure in a memory, the media cache master table having a plurality of entries that describe data sets stored in a non-volatile media cache memory;
  writing a first timecode stamp value to a first location and to a different, second location in the media cache master table at a commencement of a data transfer operation to transfer data associated with the plurality of entries;
  updating the first location with a subsequent, second timecode stamp value without updating the previously written first timecode stamp value in the second location responsive to detection of an error condition that interrupts the data transfer operation; and
  subsequently performing an error recovery operation associated with the plurality of entries responsive to a detected mismatch between the respective first and second timecode stamp values stored in the first and second locations.

2. The method of claim 1, wherein the media cache master table is a first media cache master table stored in a first non-volatile memory, the method further comprises generating and storing, in a different, second non-volatile memory, a redundant second media cache master table as a backup copy of the first media cache master table, and the data transfer operation comprises copying at least one of the plurality of entries in the first media cache master table to the second media cache master table to bring the second media cache master table into conformance with the first media cache master table.

3. The method of claim 2, wherein the writing step further comprises writing the first timecode stamp value to at least a third location in the second media cache master table concurrently with the writing of the first timecode stamp value to the first and second locations in the first media cache master table.

4. The method of claim 1, wherein the error condition comprises an unsafe power off operation associated with a data storage device that includes the media cache memory, and the method further comprises a step of, during a subsequent initialization operation of the data storage device, comparing the respective timecode stamp values stored in the first and second locations of the first media cache master table prior to the subsequently performing step.

5. The method of claim 1, further comprising transferring input write data from a host device to the media cache memory, and subsequently transferring the input write data from the media cache memory to a non-volatile main memory, wherein a new entry is added to the media cache master table responsive to each data set of said input write data being added to the media cache memory to describe the associated data set, and wherein new datecode stamp values are written to the respective first and second locations of the media cache master table responsive to the addition of each new entry.

6. The method of claim 1, further comprising storing an incrementing sequence number in a third location in the first media cache master table, the incrementing sequence number incremented each time a new entry of the plurality of entries is added to the first media cache master table.

7. The method of claim 1, wherein the media cache master table comprises a header portion located adjacent a beginning of the data structure and a footer portion located adjacent an end of the data structure, wherein a selected one of the first or second locations is disposed within the header portion and the remaining one of the first or second locations is disposed within the footer portion.

8. The method of claim 1, wherein the timecode stamp value is an incrementing count generated by a timecode generator circuit indicative of elapsed time since a reference point in time.

9. The method of claim 1, wherein the timecode stamp value indicates a time value that includes at least days, hours, minutes, seconds and portions of seconds.

10. The method of claim 1, implemented in a data storage device comprising a rotatable magnetic recording medium used as a non-volatile main memory location to which the data sets stored in the media cache are subsequently transferred, and wherein the maintaining, writing, updating and subsequently performing steps are characterized as programming instructions stored in a memory and used by a programmable media cache controller circuit during operation of the data storage device to manage the media cache.

11. The method of claim 10, wherein the media cache comprises a portion of a recording surface of the rotatable magnetic recording medium.

12. A data storage device, comprising:
a non-volatile main memory configured to provide long term storage of user data supplied to the data storage device from a host device;
a non-volatile media cache memory configured to temporarily store user data received from the host device prior to a transfer of the user data from the media cache memory to the main memory;
a first non-volatile memory configured to store a first media cache master table as a data structure having a plurality of entries that describe the user data in the media cache memory;
a different, second non-volatile memory configured to store a redundant, second media cache master table nominally as a backup copy of the first media cache master table;
a master cache controller circuit configured to write a first timecode stamp value to each of a first location and to a different, second location in the first media cache master table at a commencement of a data transfer operation to copy at least one of the plurality of entries from the first media cache management table to the second media cache management table, to update the first location with a subsequent, second timecode stamp value without updating the previously written first timecode stamp value in the second location responsive to detection of an error condition that interrupts the data transfer operation, and to subsequently perform an error recovery operation associated with the plurality of entries responsive to a detected mismatch between the newer, second timecode stamp value in the first location and the older, first timecode stamp value in the second location.

13. The data storage device of claim 12, wherein the master cache controller circuit is further configured to write the first timecode stamp value to at least a third location in the second media cache master table concurrently with the writing of the first timecode stamp value to the first and second locations in the first media cache master table.

14. The data storage device of claim 12, wherein the error condition comprises an unsafe power off operation associated with the data storage device.

15. The data storage device of claim 12, wherein the non-volatile main memory comprises a rotatable magnetic recording media disc.

16. The data storage device of claim 15, wherein the media cache memory comprises a portion of a recording surface of the rotatable magnetic recording media disc.

17. The data storage device of claim 15, wherein the media cache memory comprises a non-volatile solid state semiconductor memory.

18. The data storage device of claim 12, wherein the media cache controller is further configured to transfer the user data from the host device to the media cache memory, subsequently transfer the input write data from the media cache memory to the non-volatile main memory, add a new entry to the media cache master table responsive to each data set of said user data added to the media cache memory to describe the associated data set, and to periodically update the second media cache master table with said new entries added to the first media cache master table.

19. The data storage device of claim 12, wherein each of the first and second media cache master tables further stores an incrementing sequence number that is incremented each time a new entry is added to the respective first or second media cache master table.

20. The data storage device of claim 12, wherein each of the first and second media cache master tables comprises a header portion located adjacent a beginning of the data structure and a footer portion located adjacent an end of the data structure, wherein a selected one of the first or second locations is disposed within the header portion and the remaining one of the first or second locations is disposed within the footer portion.

\* \* \* \* \*